United States Patent
Fujishiro

(10) Patent No.: US 12,256,427 B2
(45) Date of Patent: Mar. 18, 2025

(54) COMMUNICATION CONTROL METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 371 days.

(21) Appl. No.: 17/454,436

(22) Filed: Nov. 10, 2021

(65) Prior Publication Data

US 2022/0070926 A1 Mar. 3, 2022

Related U.S. Application Data

(63) Continuation of application No. PCT/JP2020/019341, filed on May 14, 2020.

(30) Foreign Application Priority Data

May 16, 2019 (JP) ................... 2019-093196

(51) Int. Cl.
*H04W 16/14* (2009.01)
*H04W 28/04* (2009.01)
*H04W 74/0808* (2024.01)
*H04W 74/0833* (2024.01)
*H04W 76/18* (2018.01)
(Continued)

(52) U.S. Cl.
CPC ....... *H04W 74/0808* (2013.01); *H04W 16/14* (2013.01); *H04W 28/04* (2013.01); *H04W 74/0841* (2013.01); *H04W 76/18* (2018.02); *H04W 84/02* (2013.01); *H04W 88/02* (2013.01);
(Continued)

(58) Field of Classification Search
CPC .... H04L 1/12–1896; H04W 16/14–16; H04W 28/02–26; H04W 48/02–20; H04W 56/001–003; H04W 74/002–0891; H04W 76/10–19;
(Continued)

(56) References Cited

U.S. PATENT DOCUMENTS

2020/0045735 A1* 2/2020 Kin ................... H04W 74/0808
2020/0245371 A1* 7/2020 Chande ............. H04W 74/0833
2022/0078851 A1* 3/2022 Hong ................ H04W 74/0833

OTHER PUBLICATIONS

ZTE Corporation, Sanechips, "New work item: 2-step RACH for NR", 3GPP TSG RAN Meeting #82; RP-182894; Dec. 10-13, 2018; pp. 1-5; Sorrento, Italy.

* cited by examiner

*Primary Examiner* — Timothy J Weidner
(74) *Attorney, Agent, or Firm* — Studebaker Brackett PLLC

(57) ABSTRACT

A communication control method is a method performed in a user equipment. The communication control method includes the steps of: when a random access procedure is performed for a base station operated in an unlicensed band in which LBT before transmission is required, transmitting a message to the base station and then receiving a response to the message from the base station; and controlling the number of transmission occasions that allow the message to be transmitted before the response is received. The controlling of the number of the transmission occasions includes, when a failure occurs in an n-th (n≥1) random access procedure due to a failure of the LBT, causing the number of the transmission occasions in an (n+1)-th random access procedure to be larger than the number of the transmission occasions in the n-th random access procedure.

2 Claims, 12 Drawing Sheets

(51) Int. Cl.
 *H04W 84/02* (2009.01)
 *H04W 88/02* (2009.01)
 *H04W 88/08* (2009.01)
 *H04W 92/02* (2009.01)
 *H04W 92/10* (2009.01)

(52) U.S. Cl.
 CPC ............ *H04W 88/08* (2013.01); *H04W 92/02* (2013.01); *H04W 92/10* (2013.01)

(58) Field of Classification Search
 CPC ..... H04W 84/02–16; H04W 88/02–12; H04W 92/02–04; H04W 92/10
 See application file for complete search history.

COMMUNICATION CONTROL METHOD AND USER EQUIPMENT

RELATED APPLICATIONS

The present application is a continuation based on PCT Application No. PCT/JP2020/019341, filed on May 14, 2020, which claims the benefit of Japanese Patent Application No. 2019-093196 filed on May 16, 2019. The content of which is incorporated by reference herein in their entirety.

TECHNICAL FIELD

The present disclosure relates to a communication control method and a user equipment used in a mobile communication system.

BACKGROUND ART

In Long Term Evolution (LTE) of the 3rd Generation Partnership Project (3GPP), License-Assisted Access (LAA) has been defined that allows LTE communication to be performed by using a combination of a licensed band being a frequency band of which license is required and an unlicensed band being a frequency band of which license is not required. Note that the unlicensed band may be referred to as an Unlicensed spectrum.

In recent years, New Radio (NR) as the 5th generation (5G) radio access technology has been standardized in 3GPP. Although, in the present specifications of NR, a system of using the unlicensed band is not defined, 3GPP has started the discussion for introducing a technology called NR-U which uses the unlicensed band in NR communication.

In NR-U, it is assumed that it becomes possible to use only the unlicensed band without using the unlicensed band in combination with the licensed band. Under such an assumption, a new function is considered to be required, the new function being a function which is not provided in LAA.

CITATION LIST

Non-Patent Literature

NPL 1: 3GPP Contribution "RP-182894", December 2018

SUMMARY

A communication control method according to a first aspect is a method executed in a user equipment. The communication control method includes: when a random access procedure is performed for a base station operated in an unlicensed band in which LBT before transmission is required, transmitting a message to the base station and then receiving a response to the message from the base station; and controlling the number of transmission occasions that allow the message to be transmitted before the response is received. The controlling of the number of the transmission occasions includes, when a failure occurs in an n-th (n≥1) random access procedure due to a failure of the LBT, causing the number of the transmission occasions in an (n+1)-th random access procedure to be larger than the number of the transmission occasions in the n-th random access procedure.

A user equipment according to a second aspect is an apparatus for performing a random access procedure for a base station operated in an unlicensed band in which LBT before transmission is required. The user equipment includes: a transceiver configured to transmit a message to the base station and then receive a response to the message from the base station; and a controller configured to control the number of transmission occasions that allow the message to be transmitted before receiving the response. When a failure occurs in an n-th (n≥1) random access procedure due to a failure of the LBT, the controller is configured to cause the number of the transmission occasions in an (n+1)-th random access procedure to be larger than the number of the transmission occasions in the n-th random access procedure.

DESCRIPTION OF EMBODIMENTS

When a user equipment performs a random access procedure for a base station managed in an unlicensed band, there is a problem that the user equipment may fail in the random access procedure due to a failure of Listen Before Talk (LBT), causing the user equipment to be unable to access the base station.

In light of this, the present disclosure enables the random access procedure for the base station managed in the unlicensed band to succeed more easily.

A mobile communication system according to an embodiment will be described with reference to the drawings. In the description of the drawings, the same or similar parts are designated with the same or similar reference signs.

Configuration of Mobile Communication System

First, a configuration of a mobile communication system according to an embodiment will be described. Although the mobile communication system according to the embodiment is a 5G system of 3GPP, LTE may be at least partially applied to the mobile communication system.

Figure 1:
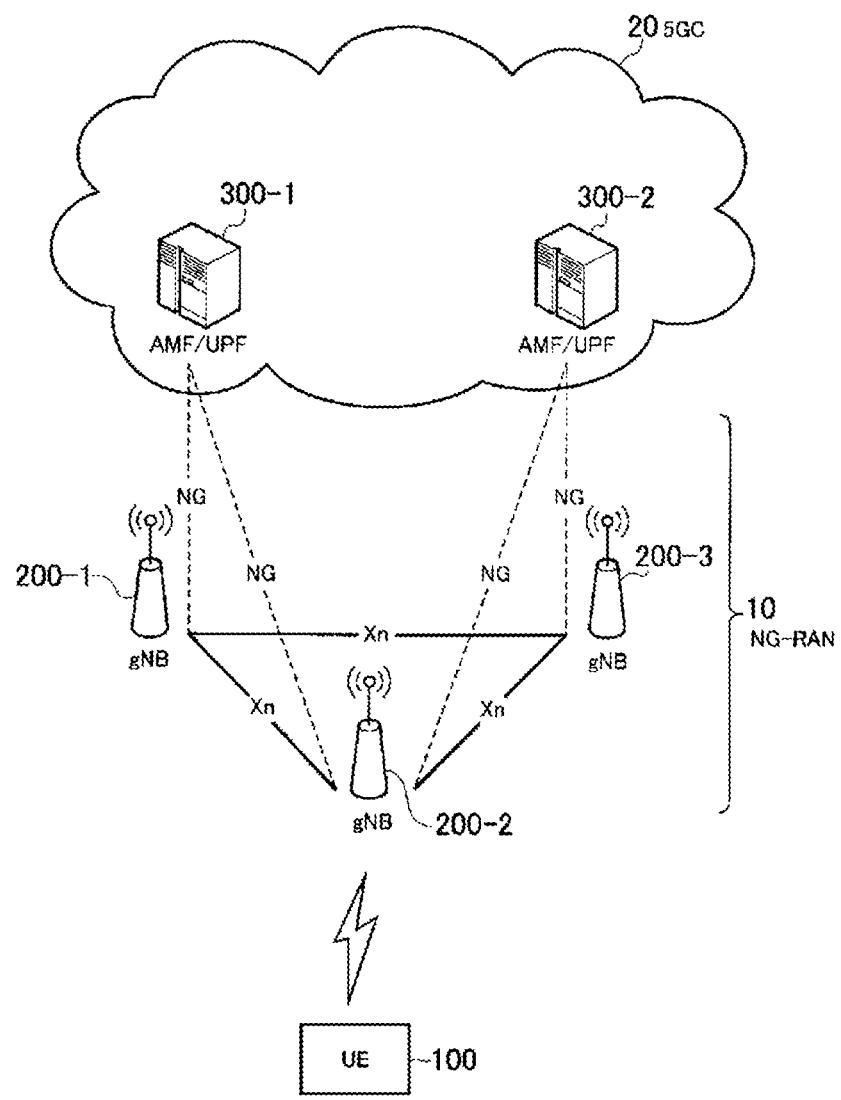
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a User Equipment (UE) 100, a 5G radio access network (Next Generation Radio Access Network (NG-RAN)) 10, and a 5G core network (5GC) 20.

The UE 100 is a movable apparatus. The UE 100 may be any apparatus so long as it is an apparatus utilized by a user. Examples of the UE 100 include a mobile phone terminal (including a smartphone), a tablet terminal, a laptop, a communication module (including a communication card or a chipset), a sensor or an apparatus provided in a sensor, a vehicle or an apparatus provided in a vehicle (vehicle UE), or an air vehicle or an apparatus provided in an air vehicle (aerial UE).

The NG-RAN 10 includes base stations (each of which is referred to as a "gNB" in the 5G system) 200. The gNB 200 may be also referred to as an NG-RAN node. The gNBs 200 are connected to each other via an Xn interface that is an inter-base station interface. The gNB 200 manages one or more cells. The gNB 200 performs radio communication with the UE 100 that has established a connection with a cell of the gNB 200. The gNB 200 has a radio resource management (RRM) function, a user data (hereinafter simply referred to as "data") routing function, a measurement control function for mobility control and scheduling, and/or the like. A "cell" is used as a term that indicates a minimum unit of a radio communication area. A "cell" is also used as a term that indicates a function or resource that performs radio communication with the UE 100. One cell belongs to one carrier frequency.

Note that a gNB may be connected to an Evolved Packet Core (EPC) which is an LTE core network, or an LTE base station may be connected to a 5GC. Moreover, the LTE base station may be connected to the gNB via the inter-base station interface.

The 5GC 20 includes an Access and Mobility Management Function (AMF) and a User Plane Function (UPF) 300. The AMF performs various types of mobility control for the UE 100, and the like. The AMF manages information of an area in which the UE 100 exists by communicating with the UE 100 by using Non-Access Stratum (NAS) signaling. The UPF performs data transfer control. The AMF and the UPF are connected to the gNB 200 via an NG interface which is a base station to core network interface.

Figure 2:
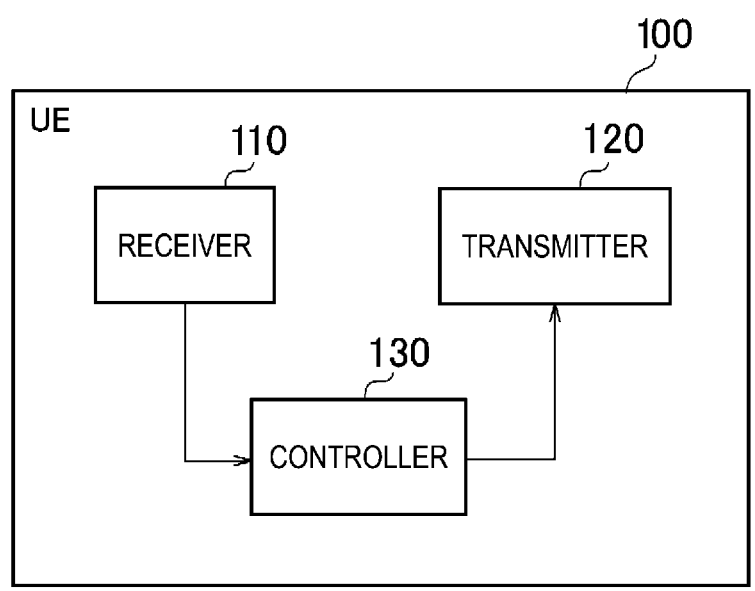
FIG. 2 is a diagram illustrating a configuration of a user equipment according to an embodiment.

FIG. 2 is a diagram illustrating a configuration of the UE 100 (user equipment).

As illustrated in FIG. 2, the UE 100 includes a receiver 110, a transmitter 120, and a controller 130. The receiver 110 and the transmitter 120 constitute a transceiver.

The receiver 110 performs various types of reception under control of the controller 130. The receiver 110 includes an antenna and a receiving unit. The receiving unit converts a radio signal received by the antenna into a baseband signal (reception signal) and outputs the signal to the controller 130.

The transmitter 120 performs various type of transmission under control of the controller 130. The transmitter 120 includes the antenna and a transmitting unit. The transmitting unit converts the baseband signal (transmission signal) output by the controller 130 into a radio signal and transmits the signal from the antenna.

The controller 130 performs various type of control in the UE 100. The controller 130 includes at least one processor and at least one memory electrically connected to the processor. The memory stores programs to be executed by the processor and information used for processing by the processor. The processor may include a baseband processor and a Central Processing Unit (CPU). The baseband processor performs modulation/demodulation and coding/decoding of the baseband signal, and the like. The CPU executes the programs stored in the memory to perform various types of process.

Figure 3:
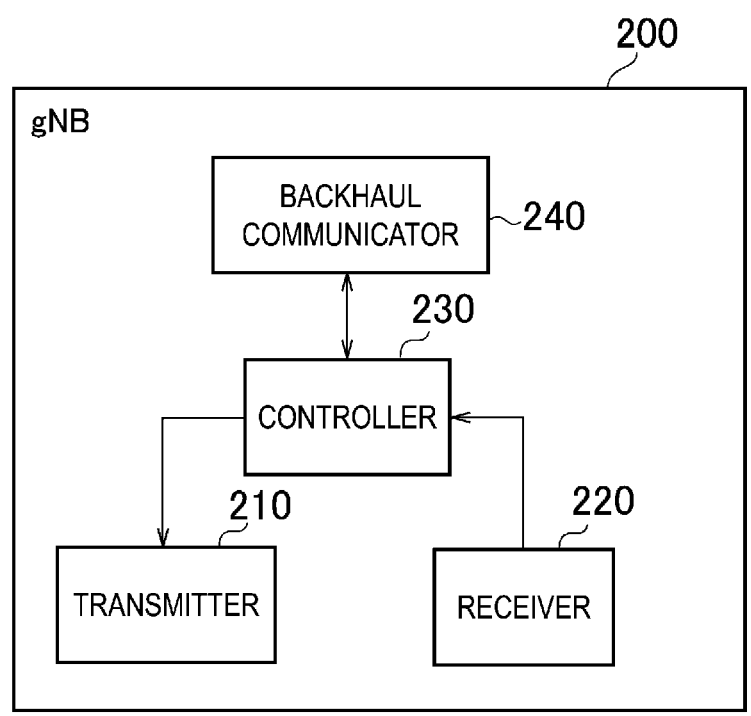
FIG. 3 is a diagram illustrating a configuration of a base station according to an embodiment.

FIG. 3 is a diagram illustrating a configuration of the gNB 200 (base station).

As illustrated in FIG. 3, the gNB 200 includes a transmitter 210, a receiver 220, a controller 230, and a backhaul communicator 240.

The transmitter 210 performs various types of transmission under control of the controller 230. The transmitter 210 includes an antenna and a transmitting unit. The transmitting unit converts a baseband signal (transmission signal) output by the controller 230 into a radio signal and transmits the signal from the antenna.

The receiver 220 performs various types of reception under control of the controller 230. The receiver 220 includes the antenna and a receiving unit. The receiving unit converts the radio signal received by the antenna into a baseband signal (reception signal) and outputs the signal to the controller 230.

The controller 230 performs various type of control in the gNB 200. The controller 230 includes at least one processor and at least one memory electrically connected to the processor. The memory stores programs to be executed by the processor and information used for processing by the processor. The processor may include a baseband processor and a CPU. The baseband processor performs modulation/demodulation and coding/decoding of the baseband signal, and the like. The CPU executes the programs stored in the memory to perform various types of process.

The backhaul communicator 240 is connected to a neighboring base station via the inter-base station interface. The backhaul communicator 240 is connected to the AMF/UPF 300 via the base station to core network interface. Note that the gNB may include a Central Unit (CU) and a Distributed Unit (DU) (i.e., may be functionally divided), and both units may be connected to each other via an F1 interface.

Figure 4:
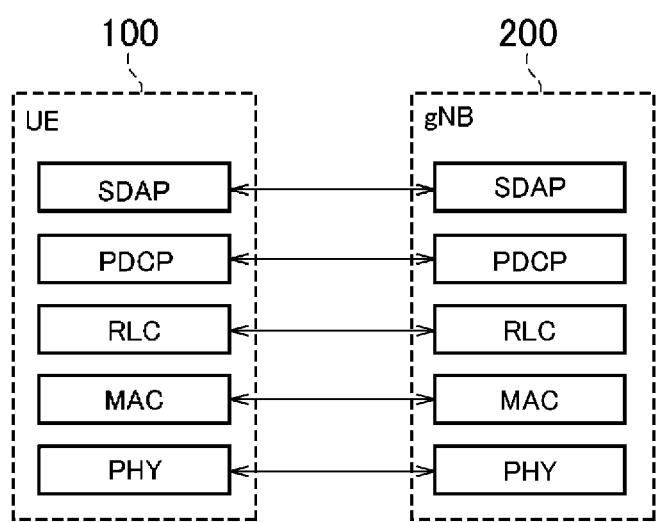
FIG. 4 is a diagram illustrating a configuration of a radio interface protocol stack in a user plane according to an embodiment.

FIG. 4 is a diagram illustrating a configuration of a radio interface protocol stack in a user plane handling data.

As illustrated in FIG. 4, the radio interface protocol in the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding/decoding, modulation/demodulation, antenna mapping/demapping, and resource mapping/demapping. Data and control information are transmitted via a physical channel between the PHY layer of the UE 100 and the PHY layer of the gNB 200.

The MAC layer performs priority control of data, retransmission processing by hybrid ARQ (HARQ), a random access procedure, and the like. Data and control information are transmitted via a transport channel between the MAC layer of the UE 100 and the MAC layer of the gNB 200. The MAC layer of the gNB 200 includes a scheduler. The scheduler determines uplink and downlink transport formats (a transport block size, and a modulation and coding scheme (MCS)) and resource blocks allocated to the UE 100.

The RLC layer transmits data to the RLC layer on the receiver side using the functions of the MAC layer and PHY layer. Data and control information are transmitted between the RLC layer of the UE 100 and the RLC layer of the gNB 200 via a logical channel.

The PDCP layer performs header compression/extension and encryption/decryption.

The SDAP layer performs mapping between an IP flow that is a unit by which the core network performs QoS control and a radio bearer that is a unit by which an Access Stratum (AS) performs QoS control. Note that in a case where a RAN is connected to the EPC, SDAP is not necessary.

Figure 5:
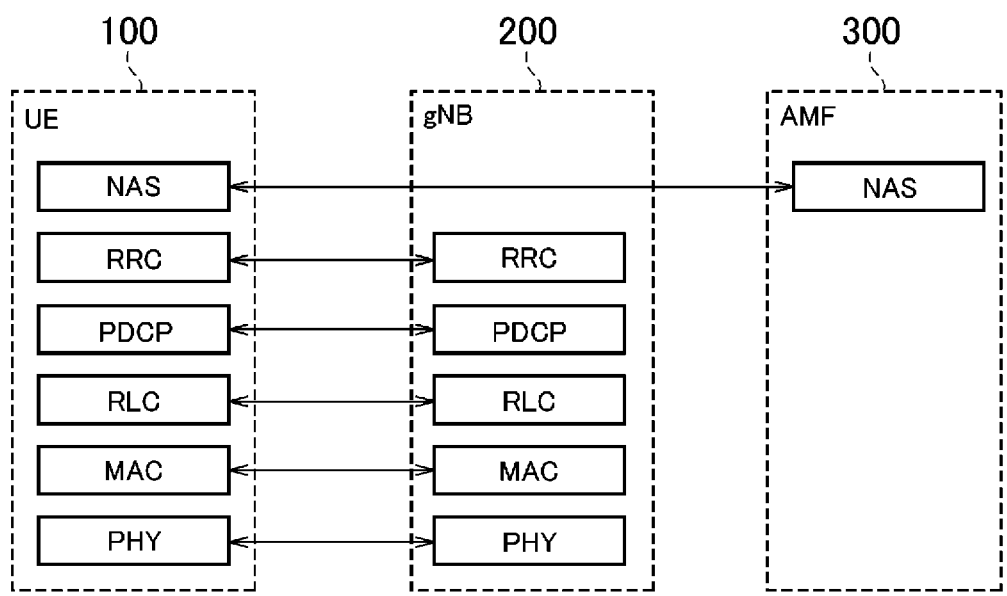
FIG. 5 is a diagram illustrating a configuration of a radio interface protocol stack in a control plane according to an embodiment.

FIG. 5 is a diagram illustrating a configuration of a radio interface protocol stack in a control plane handling signaling (control signal).

As illustrated in FIG. 5, the radio interface protocol stack in the control plane includes a Radio Resource Control (RRC) layer and a Non-Access Stratum (NAS) layer instead of the SDAP layer illustrated in FIG. 4.

RRC signaling for various types of configuration is transmitted between the RRC layer of the UE 100 and the RRC layer of the gNB 200. The RRC layer controls the logical channel, the transport channel, and the physical channel in response to establishing, re-establishing, and releasing the radio bearer. In a case where there is a connection (RRC connection) between the RRC of the UE 100 and the RRC of the gNB 200, the UE 100 is in an RRC connected state. In a case where there is no connection (RRC connection) between the RRC of the UE 100 and the RRC of the gNB 200, the UE 100 is in an RRC idle state. In a case where the RRC connection is suspended, the UE 100 is in an RRC inactive state.

The RRC connected state and the RRC inactive state are states in which an RRC connection for the UE 100 is established. However, the RRC inactive state is a state in which an established RRC connection is suspended. Specifically, in the RRC inactive state, context information for the UE 100 is retained in the gNB 200 and the UE 100, and thus, smooth transition to the RRC connected state can be achieved using the retained context information. The RRC idle state is a state in which an RRC connection for the UE 100 is not established.

The NAS layer located higher than the RRC layer performs session management, mobility management, and the like. NAS signaling is transmitted between the NAS layer of the UE 100 and the NAS layer of the AMF 300.

Note that the UE 100 includes an application layer or the like other than the radio interface protocol.

Overview of Random Access Procedure

Next, an overview of the random access procedure will be described. This operation relates to a contention based random access procedure.

The random access procedure includes two types, namely a non-contention based random access procedure and a contention based random access procedure. The following description mainly assumes the contention based random access procedure. However, the operation according to the embodiment to be described later may be applied to the non-contention based random access procedure.

In the non-contention based random access procedure, a preamble sequence dedicated to the UE 100 is allocated from the gNB 200 to the UE 100, and the UE 100 transmits a random access preamble to the gNB 200 by using the allocated preamble sequence. The gNB 200 can uniquely identify a transmission source UE of the random access preamble, based on the preamble sequence of the random access preamble received from the UE 100.

In contrast, in the contention based random access procedure, the UE 100 randomly selects a preamble sequence out of a plurality of preamble sequences prepared for the contention based random access procedure, and transmits the random access preamble to the gNB 200 by using the selected preamble sequence. The gNB 200 cannot uniquely identify a transmission source UE of the random access preamble. If a plurality of UEs 100 select the same preamble sequence and perform the contention based random access procedure simultaneously, contention occurs, and thus operation for resolving the contention is required.

A general contention based random access procedure is a 4-step random access procedure that completes the random access procedure through four steps.

Figure 6:
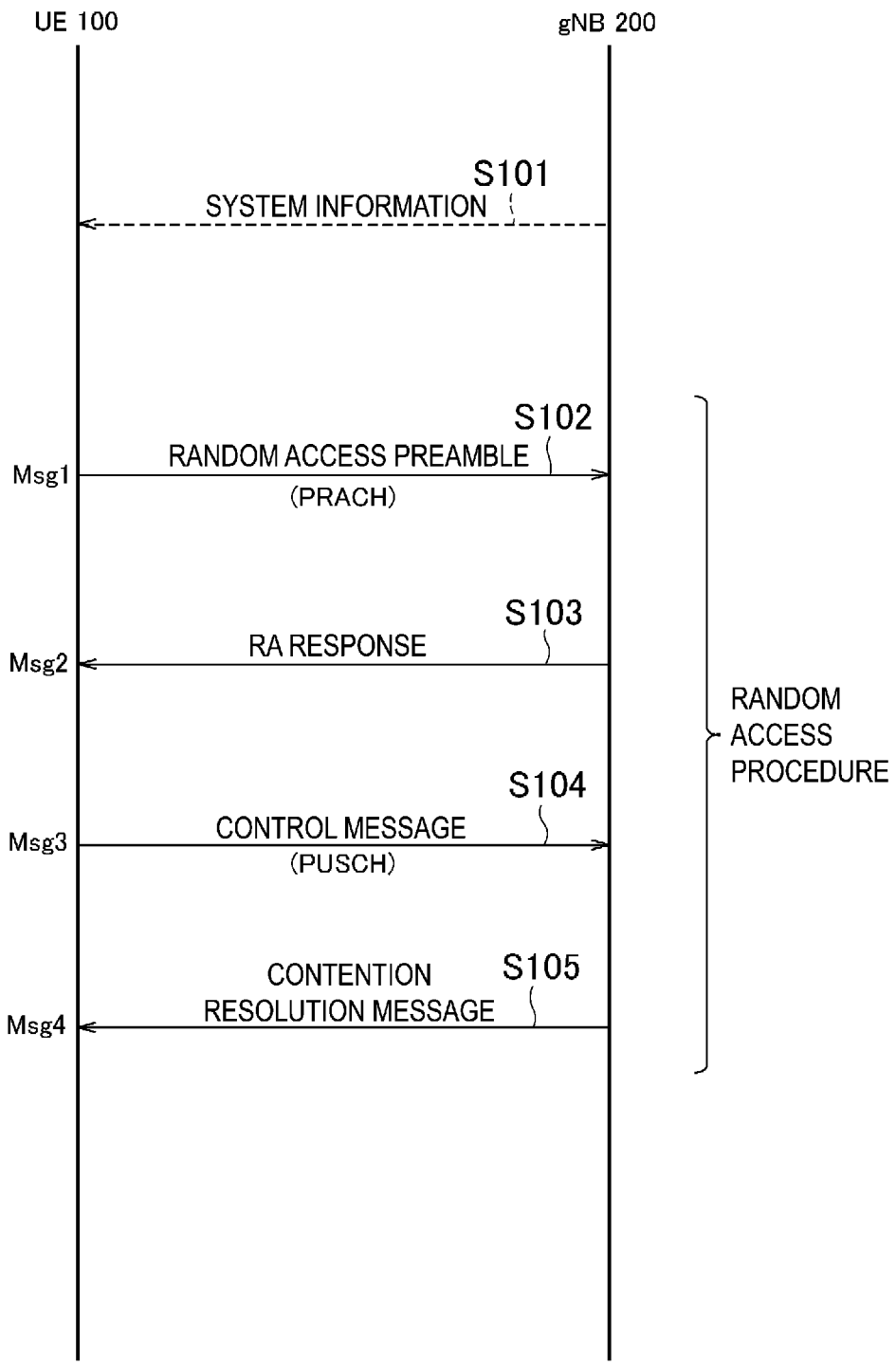
FIG. 6 is a diagram illustrating an example of a 4-step random access procedure.

FIG. 6 is a diagram illustrating an example of the 4-step random access procedure. The UE 100 in the RRC idle state or the RRC inactive state performs the random access procedure in order to transition to the RRC connected state. Such a case is referred to as initial connection. At the time of the initial connection, the contention based random access procedure is applied. The UE 100 may perform the random access procedure in order to reestablish synchronization with the gNB 200.

As illustrated in FIG. 6, in Step S101, the gNB 200 broadcasts system information (System Information Block (SIB)) including PRACH (Physical Random Access Channel) related information. The PRACH related information includes information indicating PRACH resources being time and frequency resources available for the PRACH.

The UE 100 selects any time and frequency resource out of the PRACH resources, based on the system information received from the gNB 200, and also randomly selects a preamble sequence out of the plurality of preamble sequences.

In Step S102, the UE 100 transmits the random access preamble to the gNB 200 by using the selected preamble resource. The "preamble resource" means a preamble sequence, but may be a concept including the time and frequency resource. The random access preamble is referred to as Message 1 (Msg1) in the 4-step random access procedure.

In Step S103, the gNB 200 transmits a random access response (RA response) to the UE 100, in response to reception of Msg1 from the UE 100. The RA response is referred to as Message 2 (Msg2) in the 4-step random access procedure.

The Msg2 includes preamble information, an uplink transmission grant (UL grant), a timing advance value, and a temporary identifier. Here, the preamble information is information indicating the preamble sequence of the random access preamble received from the UE 100. The UL grant is information indicating the PUSCH resource that the UE 100 uses for transmission of Msg3 described later. The timing advance value is a transmission timing adjustment value for compensating for propagation delay of a radio signal. The temporary identifier is a Temporary Cell-Radio Network Temporary Identifier (C-RNTI) that the gNB 200 allocates to the UE 100.

If the preamble sequence of the random access preamble transmitted in Step S101 and the preamble sequence indicated by the preamble information received from the gNB 200 in Step S102 match, the UE 100 determines that the UE 100 has succeeded in random access. Note that, if the plurality of UEs 100 select the same preamble sequence and transmit the random access preamble simultaneously, it may be determined that all of the plurality of UEs 100 have succeeded in random access, which causes contention.

In Step S104, the UE 100 transmits a control message including a UE identifier of the UE 100 on the Physical Uplink Access Channel (PUSCH), in response to reception of Msg2. The control message is referred to as Message 3 (Msg3) in the 4-step random access procedure. The UE identifier is an identifier different from the Temporary C-RNTI, and is an identifier specific to the UE 100.

When the UE 100 is in the RRC idle state, Msg3 may be an RRC establishment request (RRC Setup Request) message. When the UE 100 is in the RRC inactive state, Msg3 may be an RRC resume request message.

When the contention occurs, the gNB 200 may receive a plurality of Msg3s associated with one Msg2, from the plurality of UEs 100. In this case, the UE 100 selects any one of the plurality of UEs 100.

In Step S105, the gNB 200 transmits a contention resolution message including the UE identifier of the selected UE 100, to the UE 100. The contention resolution message is referred to as Message 4 (Msg4) in the 4-step random access procedure.

When the UE 100 is in the RRC idle state, Msg4 may be an RRC establishment (RRC Setup) message. When the UE 100 is in the RRC inactive state, Msg4 may be an RRC resume message.

When the UE 100 receives the contention resolution message including the UE identifier of the UE 100 itself, the UE 100 determines that the UE 100 has succeeded in the random access procedure (contention resolution). In this case, the UE 100 may transition to the RRC connected state. The UE 100 that has transitioned to the RRC connected state continuously uses the Temporary C-RNTI that is included in Msg2 as the C-RNTI allocated to the UE 100 itself while the UE 100 is in the RRC connected state.

NR-U

Next, an overview of NR-U will be described. The operation to be described later presupposes NR-U that uses the unlicensed band in NR communication. NR-U may use the unlicensed band independently, instead of using the unlicensed band in combination with the licensed band.

In the unlicensed band, there may be an interference wave from another system such as a radio LAN, and also interference may be given from a communication apparatus (the UE 100 or the gNB 200) of the mobile communication system to another system. The interference wave refers to a radio signal other than a desired wave. The desired wave refers to a radio signal (downlink signal) whose transmission timing is known in advance, such as a Synchronization Signal and PBCH block (SSB), a Master Information Block (MIB), a System Information Block type 1 (SIB1), and/or a Radio Link Monitoring Reference Signal (RLM-RS).

Thus, in the unlicensed band, the communication apparatus (the UE 100 or the gNB 200) is required to apply Listen Before Talk (LBT) before performing transmission. When LBT is applied, in order to determine whether or not there is an interference wave, specifically, whether a channel is available or is in use (busy), the UE 100 and the gNB 200 measure and monitor interference wave power of the channel.

When it is determined that there is no interference wave, specifically, that the channel is available, the communication apparatus can perform transmission. In contrast, when it is determined that there is an interference wave, specifically, that the channel is in use, the communication apparatus cannot perform transmission. When it is determined that there is no interference wave, this case is regarded as LBT success. When it is determined that there is an interference wave, this case is regarded as LBT failure.

Operation According to Embodiment

Next, operation according to an embodiment will be described. When the UE 100 performs the random access procedure for the gNB 200 managed in the unlicensed band, there is a problem that the UE 100 may fail in the random access procedure due to a failure of LBT, causing the UE 100 to be unable to access the gNB 200. The following will describe operation for enabling the random access procedure for the base station managed in the unlicensed band to succeed more easily.

A communication control method according to an embodiment is performed in the UE 100. The communication control method includes the step of, when the random access procedure is performed for the gNB 200 managed in the unlicensed band in which LBT before transmission is required, transmitting a message to the gNB 200, and then receiving a response to the message from the gNB 200.

The communication control method according to an embodiment includes the step of controlling the number of transmission occasions in which the message can be transmitted before receiving the response. When the transmission occasions include a plurality of time resources, the UE 100 transmits a plurality of messages by means of time division by using the plurality of time resources. In contrast, when the transmission occasions include a plurality of frequency resources, the UE 100 transmits a plurality of messages by means of frequency division by using the plurality of frequency resources.

Here, the message may be a random access preamble (Msg1) transmitted from the UE 100 to the gNB 200. In this case, the response to the message is a random access response (Msg2) transmitted from the gNB 200 to the UE 100. Before receiving the random access response (Msg2), the UE 100 can simultaneously transmit a plurality of random access preambles (Msg1s) to the gNB 200 in a plurality of transmission occasions.

The message may be Msg3 transmitted from the UE 100 to the gNB 200 after transmission of the random access preamble. In this case, the response to the message is Msg4 transmitted from the gNB 200 to the UE 100. Before receiving Msg4, the UE 100 can simultaneously transmit a plurality of Msg3s to the gNB 200 in a plurality of transmission occasions.

In the step of controlling of the number of the transmission occasions, when a failure occurs in the n-th (n≥1) random access procedure due to a failure of the LBT, the transmission occasions in the (n+1)-th random access procedure are increased more than the number of the transmission occasions in the n-th random access procedure. Then, the UE 100 performs LBT for each of the transmission occasions, and transmits the message to the gNB 200 in the transmission occasion in which LBT succeeds.

Here, possible cases of "when a failure occurs in the n-th (n≥1) random access procedure due to a failure of the LBT" include not only a case in which Msg1 or Msg3 fails to be transmitted to the gNB 200 due to a failure of LBT in the UE 100, but also a case in which the UE 100 fails to receive Msg2 or Msg4 due to an LBT failure of the gNB 200 (or due to interference caused by a hidden terminal).

With this configuration, in the stage of the first transmission of a message (specifically, the first random access procedure), a wasteful use of resources and interference can be reduced, and at the time of retransmission (specifically, the second and following random access procedures), an LBT success probability can be enhanced, and a probability of arrival of the message and/or the response can be enhanced. Thus, the probability that the UE 100 is unable to access the gNB 200 can be reduced.

Note that the random access procedure includes an existing technology referred to as Power Ramping. Power Ramping is a technology in which, every time the random access procedure fails, transmission power of the random access preamble is increased, and the random access procedure is attempted again. With Power Ramping, the effect of enhancing the success probability of LBT cannot be expected. However, with the communication control method according to an embodiment, by increasing the transmission occasions of the message every time the random access procedure fails, the effect of enhancing the success probability of LBT can be achieved.

Figure 7:
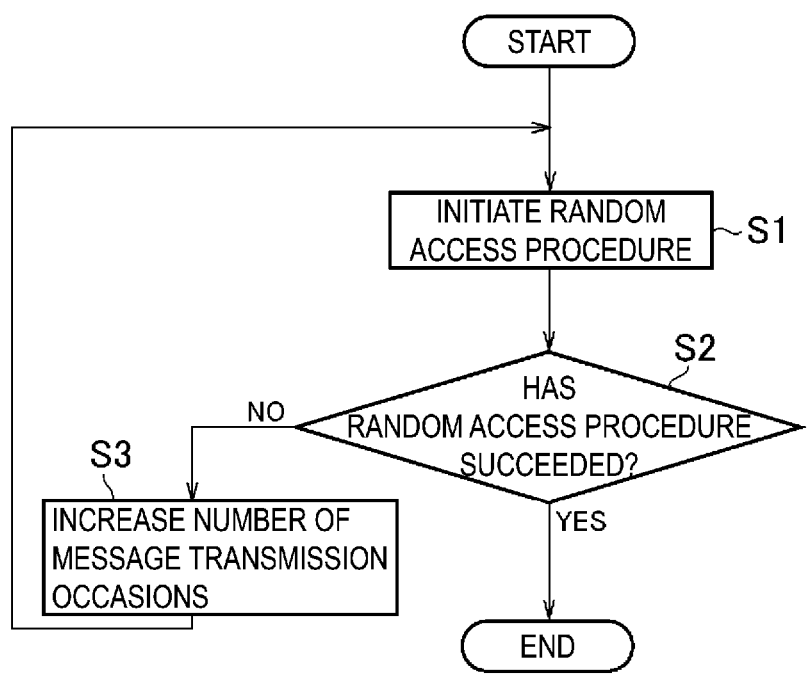
FIG. 7 is a diagram illustrating operation of the user equipment according to an embodiment.

FIG. 7 is a diagram illustrating operation of the UE 100 according to an embodiment.

As illustrated in FIG. 7, in Step S1, the UE 100 initiates the first random access procedure for the gNB 200 managed in the unlicensed band. In the first random access procedure, there may be only a single transmission occasion of the message (Msg1, Msg3). Specifically, the first random access procedure may be the random access procedure as illustrated in FIG. 6.

When the first random access procedure succeeds (Step S2: YES), the operation ends.

In contrast, when the first random access procedure fails (Step S2: NO), in Step S3, the UE 100 performs configuration so as to increase the transmission occasion of the message (Msg1, Msg3). For example, the UE 100 increments the number of transmission occasions of the message (Msg1, Msg3) (specifically, increases the transmission occasion by one). Then, the UE 100 attempts the random access procedure again (Step $1).

In this manner, the number of transmission occasions of the message (Msg1, Msg3) is increased every time there is a failure in the random access procedure until the random access procedure succeeds. The upper limit of the number of transmission occasions of the message (Msg1, Msg3) may be configured. The upper limit may be a preconfigured value (fixed value) that is defined in a specification, or may be a variable value that is configured using system information (System Information Block (SIB)) broadcast from the gNB 200.

Figure 8:
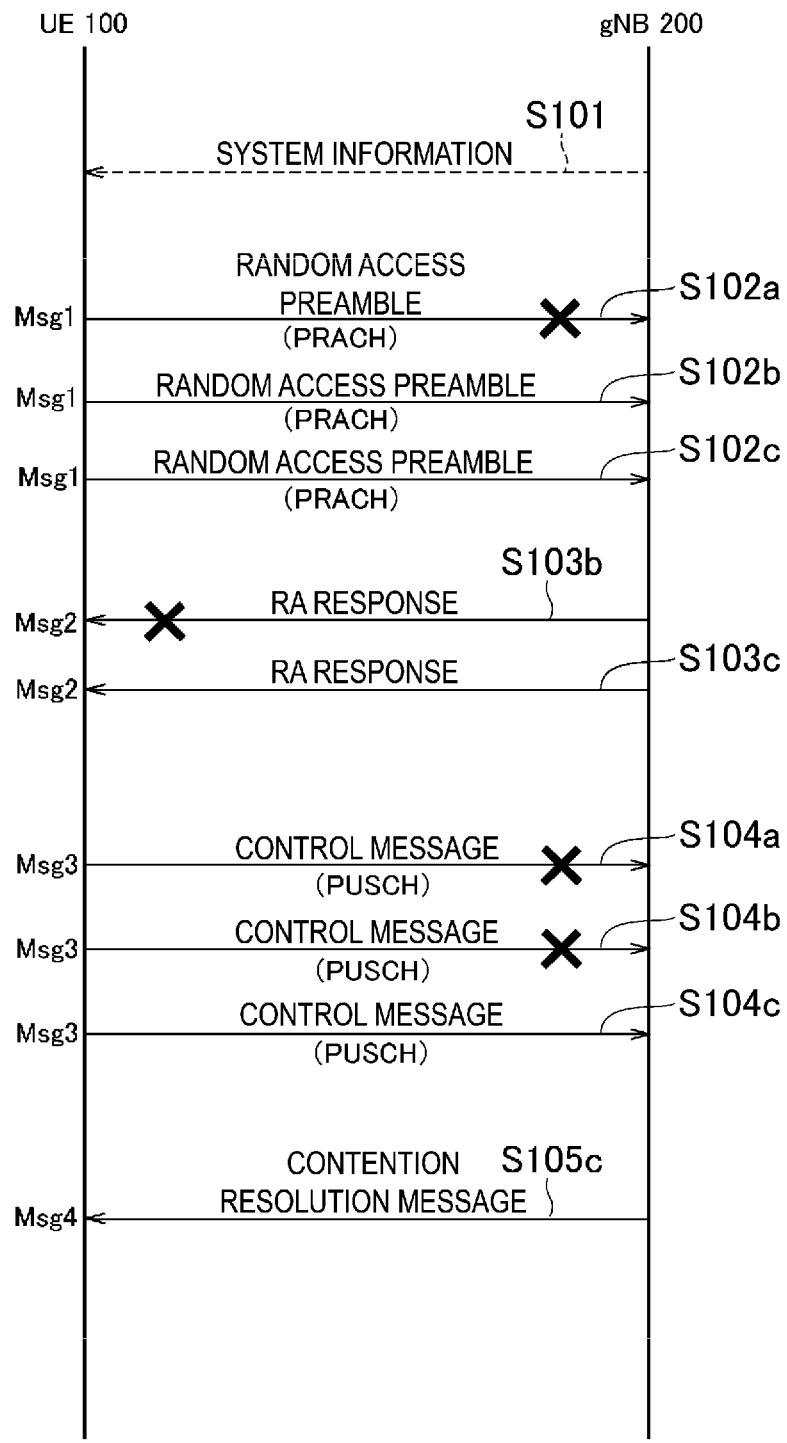
FIG. 8 is a diagram illustrating an example of a random access procedure according to an embodiment.

FIG. 8 is a diagram illustrating an example of the random access procedure according to an embodiment.

In the operation example of FIG. 8, it is assumed that, in the third random access procedure after there are failures in the first and second random access procedures, three transmission occasions of the random access preamble are configured, and three transmission occasions of Msg3 are configured. The following will describe operation that is different from the operation of FIG. 6.

As illustrated in FIG. 8, in each of the transmission occasions of Steps S102a, S102b, and S102c, the UE 100 performs LBT for transmitting the random access preamble (Msg1). In the transmission occasion of Step S102a, the UE 100 fails in LBT, and in each of the transmission occasions of Steps S102b and S102c, the UE 100 succeeds in LBT.

As a result, the UE 100 transmits the random access preamble (Msg1) to the gNB 200 in each of the transmission occasions of Steps S102b and S102c, without transmitting the random access preamble (Msg1) to the gNB 200 in the transmission occasion of Step S102a.

In Step S103b, the gNB 200 performs LBT in order to transmit the random access response (Msg2) for the random access preamble (Msg1) received from the UE 100 in Step S102b, but fails in LBT.

In Step S103c, the gNB 200 performs LBT in order to transmit the random access response (Msg2) for the random access preamble (Msg1) received from the UE 100 in Step S102c, and succeeds in LBT.

As a result, the gNB 200 transmits the random access response (Msg2) to the UE 100 in the transmission occasion of Step S103c, without transmitting the random access response (Msg2) to the UE 100 in the transmission occasion of Step S103b.

In each of the transmission occasions of Steps S104a, S104b, and S104c, the UE 100 performs LBT in order to transmit Msg3. The UE 100 fails in LBT in each of the transmission occasions of Steps S104a and 104b, and the UE 100 succeeds in LBT in the transmission occasion of Step S104c.

As a result, the UE 100 transmits Msg3 to the gNB 200 in the transmission occasion of Step S104c, without transmitting Msg3 to the gNB 200 in each of the transmission occasions of Steps S104a and 104b.

In Step S105c, the gNB 200 performs LBT in order to transmit the response (Msg4) for Msg3 received from the UE 100 in Step S104c, and succeeds in LBT. The gNB 200 transmits Msg4 to the UE 100 in the transmission occasion of Step S105c.

Figure 9:
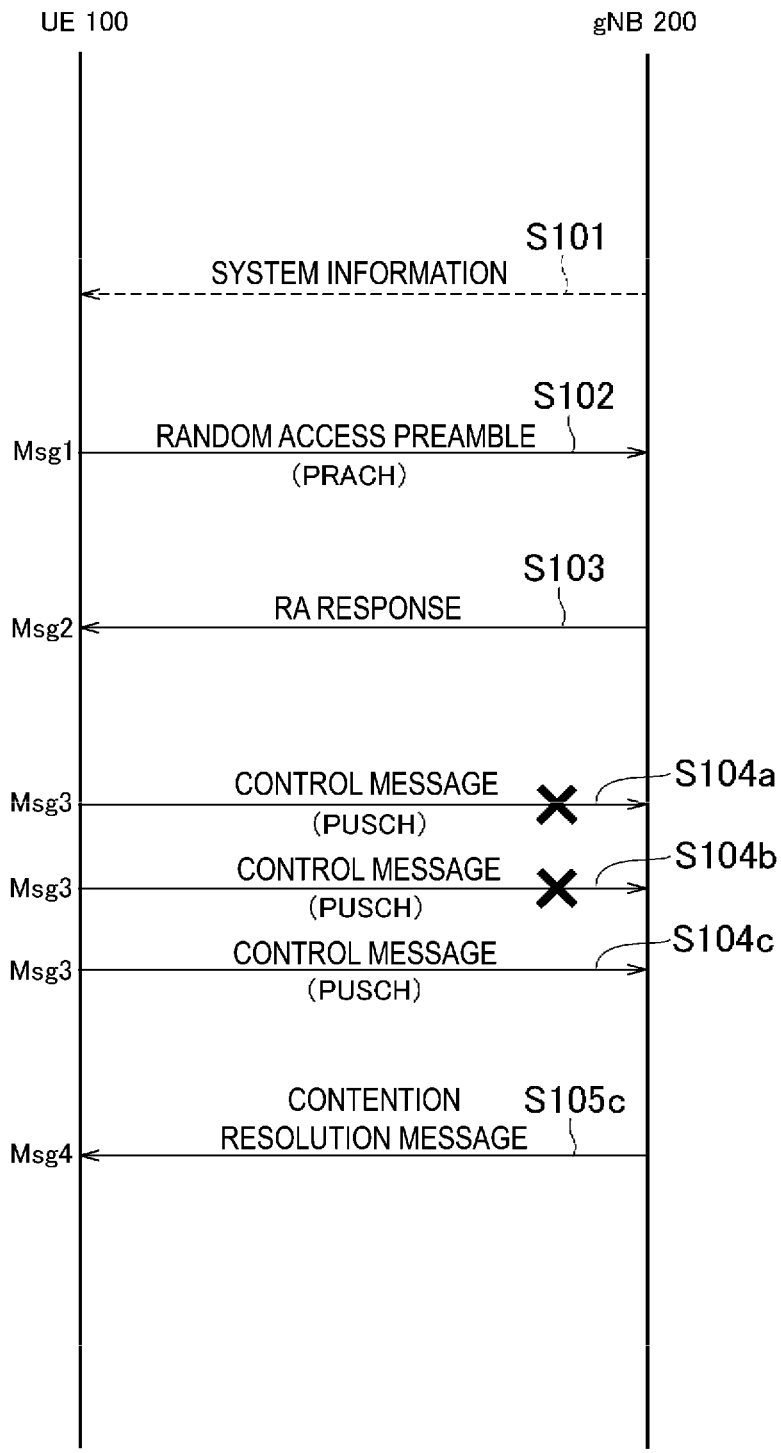
FIG. 9 is a diagram illustrating another example of the random access procedure according to an embodiment.

FIG. 9 is a diagram illustrating another example of the random access procedure according to an embodiment.

In the operation example of FIG. 9, it is assumed that, in the third random access procedure after there are failures in the first and second random access procedures, three transmission occasions of Msg3 are configured. The following will describe operation that is different from the operation of FIG. 6.

As illustrated in FIG. 9, in the transmission occasion of Step S102, the UE 100 performs LBT in order to transmit the random access preamble (Msg1), and succeeds in LBT. The UE 100 transmits the random access preamble (Msg1) to the gNB 200 in the transmission occasion of Step S102.

Here, the UE 100 may report an indication that there are a plurality of transmission occasions of Msg3, to the gNB 200 by using the random access preamble (Msg1). For example, there are a plurality of types of PRACH resources that the gNB 200 reports by using the system information (Step S101), and the number of transmission occasions of Msg3 are associated with respective PRACH resources.

As the first example, the first PRACH resource that is used when there is one transmission occasion of Msg3 and the second PRACH resource that is used when there are a plurality of transmission occasions of Msg3 are provided. The UE 100 selects the second PRACH resource, and transmits the random access preamble (Msg1) to the gNB 200 by using the second PRACH resource. The gNB 200 that has received the random access preamble (Msg1) recognizes that there are a plurality of transmission occasions of Msg3, based on the second PRACH resource.

As the second example, the first PRACH resource that is used when there is one transmission occasion of Msg3, the second PRACH resource that is used when there are two transmission occasions of Msg3, and the third PRACH resource that is used when there are three transmission occasions of Msg3 are provided. The UE 100 selects the third PRACH resource, and transmits the random access preamble (Msg1) to the gNB 200 by using the third PRACH resource. The gNB 200 that has received the random access preamble (Msg1) recognizes that there are three transmission occasions of Msg3, based on the third PRACH resource.

In Step S103, the gNB 200 performs LBT in order to transmit the random access response (Msg2) for the random access preamble (Msg1) received from the UE 100 in Step S102, and succeeds in LBT. The gNB 200 transmits the random access response (Msg2) to the UE 100 in the transmission occasion of Step S103. The random access response (Msg2) may include scheduling information (UL grant) for allocating three transmission occasions to the UE 100 for Msg3 transmission.

In each of the transmission occasions of Steps S104a, S104b, and S104c, the UE 100 performs LBT in order to transmit Msg3. The UE 100 fails in LBT in each of the transmission occasions of Steps S104a and 104b, and the UE 100 succeeds in LBT in the transmission occasion of Step S104c.

As a result, the UE 100 transmits Msg3 to the gNB 200 in the transmission occasion of Step S104c, without transmitting Msg3 to the gNB 200 in each of the transmission occasions of Steps S104a and 104b.

In Step S105c, the gNB 200 performs LBT in order to transmit the response (Msg4) for Msg3 received from the UE 100 in Step S104c, and succeeds in LBT. The gNB 200 transmits Msg4 to the UE 100 in the transmission occasion of Step S105c.

Figure 10:
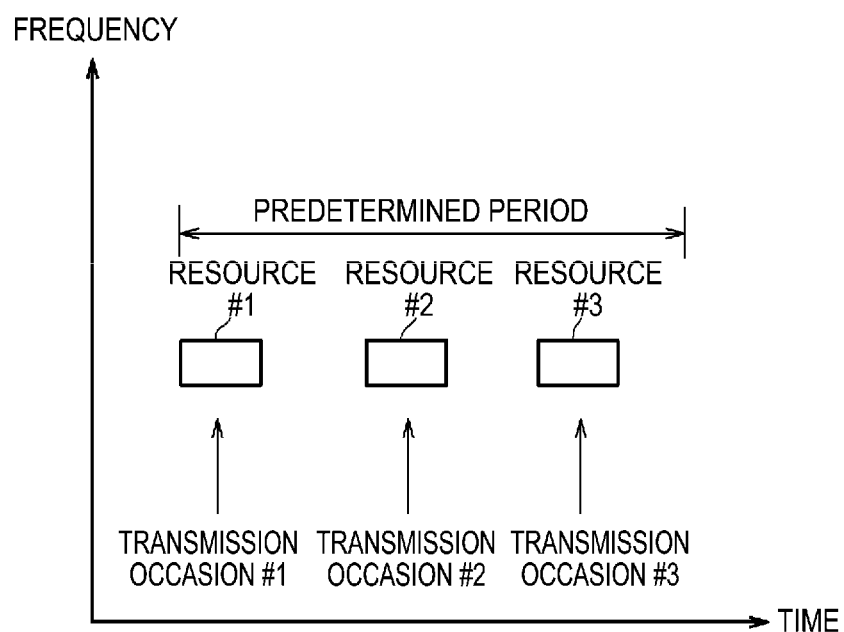
FIG. 10 is a diagram illustrating an example of a plurality of transmission occasions according to an embodiment.

FIG. 10 is a diagram illustrating an example of a plurality of transmission occasions according to an embodiment.

As illustrated in FIG. 10, when the transmission occasions include a plurality of time resources (resources #1 to #3), the UE 100 transmits a plurality of messages (a plurality of Msg1s, a plurality of Msg3s) by means of time division by using the plurality of time resources. Each of the time resources is, for example, a subframe. Note that, in FIG. 10, an example in which the plurality of time resources are provided discontinuously in the time direction is illustrated. However, the plurality of time resources may be provided continuously in the time direction. A predetermined period in which the plurality of time resources are provided may be a period corresponding to a maximum reception waiting time for a response, with respect to the first time resource (resource #1).

Figure 11:
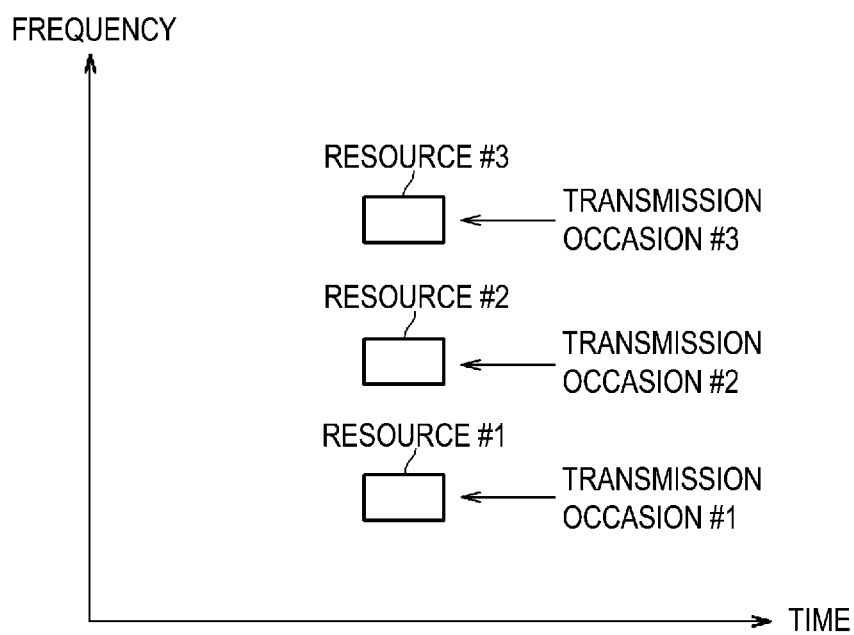
FIG. 11 is a diagram illustrating another example of a plurality of transmission occasions according to an embodiment.

FIG. 11 is a diagram illustrating another example of a plurality of transmission occasions according to an embodiment.

As illustrated in FIG. 11, when the transmission occasions include a plurality of frequency resources (resources #1 to #3), the UE 100 transmits a plurality of messages (a plurality of Msg1s, a plurality of Msg3s) by means of frequency division by using the plurality of frequency resources. Each of the frequency resources is, for example, a physical resource block. Note that, in FIG. 11, an example in which the plurality of frequency resources are provided discontinuously in the frequency direction is illustrated. However, the plurality of frequency resources may be provided continuously in the frequency direction. The plurality of frequency resources may be provided in the carrier frequency of one cell, or may be provided in the carrier frequency of a plurality of cells in a distributed manner.

OTHER EMBODIMENTS

Figure 12:
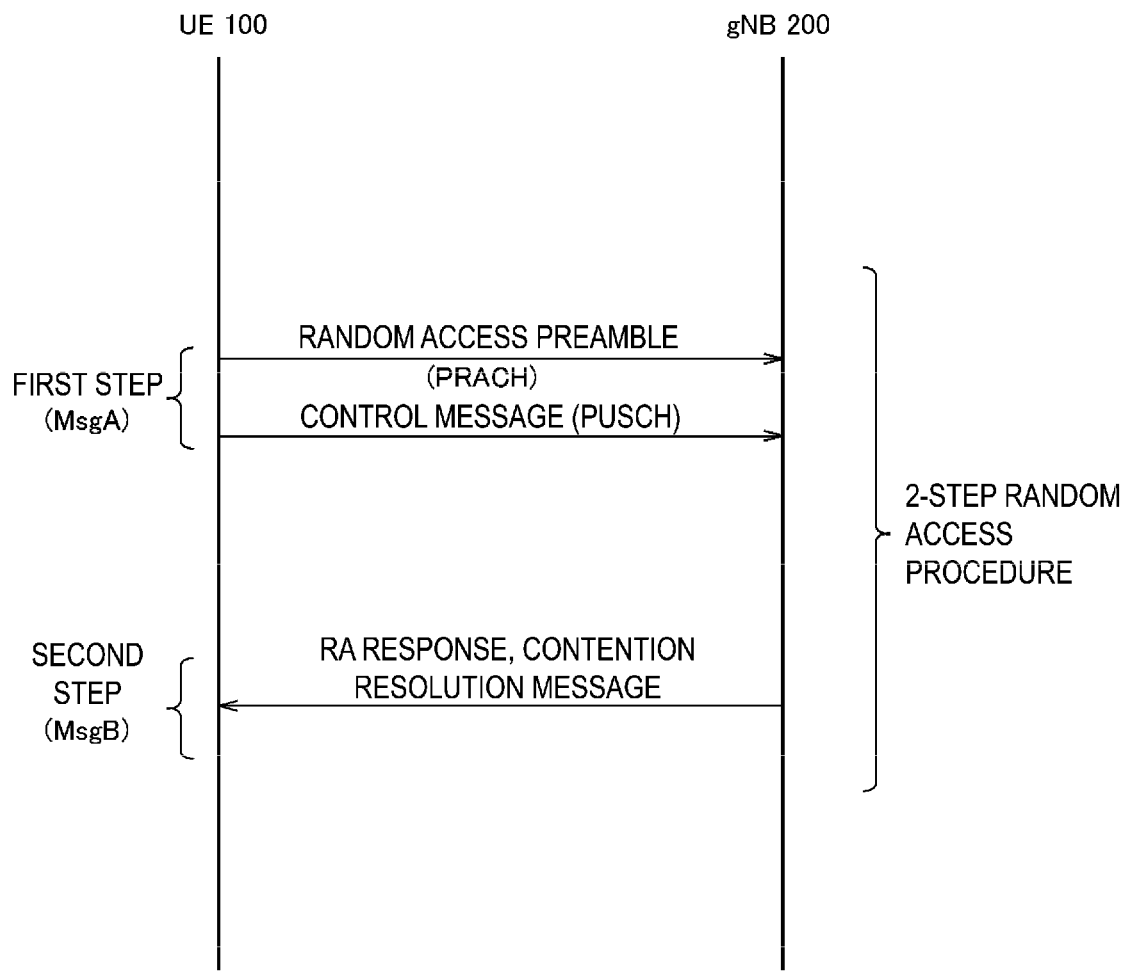
FIG. 12 is a diagram illustrating an example of a 2-step random access procedure.

In the embodiment described above, the 4-step random access procedure is described. However, a 2-step random access procedure may be adopted. FIG. 12 is a diagram illustrating an example of the 2-step random access procedure. As illustrated in FIG. 12, the 2-step random access procedure completes the contention based random access procedure through the first step of performing message (MsgA) transmission from the UE 100 to the gNB 200, and the second step of performing message (Msg3) transmission from the gNB 200 to the UE 100 after the first step. With this configuration, exchange of messages can be reduced in comparison to the 4-step random access procedure. The MsgA includes a random access preamble, and a control message corresponding to Msg3. The MsgB includes a random access response, and a contention resolution message corresponding to Msg4.

The embodiments above are described mainly for a 5G system (NR), but the operations according to the embodiments may be applied to LTE.

A program causing a computer to execute each of the processes performed by the UE 100 or the gNB 200 may be provided. The program may be recorded in a computer readable medium. Use of a computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for performing the processes performed by the UE 100 or the gNB 200 may be integrated to configure at least a portion of the UE 100 or the gNB 200 as a semiconductor integrated circuit (chipset, SoC).

An embodiment has been described above in detail with reference to the drawings; however, specific configurations are not limited to those described above, and various design modifications can be made without departing from the gist of the present disclosure.

The invention claimed is:

1. A communication control method performed in a wireless communication device, the communication control method comprising:
   when a random access procedure is performed for a base station operated in an unlicensed band in which Listen Before Talk (LBT) before transmission is required, transmitting a message to the base station and then receiving a response to the message from the base station;
   during an n-th (n≥1) random access procedure, transmitting the message to the base station on transmission occasions determined by a parameter and attempting to receive the response to the message after the transmitting; and
   in response to a failure occurring during the n-th (n≥1) random access procedure, increasing, according to a fixed value defined by a communication specification, the parameter used to determine transmission occasions in an (n+1)-th random access procedure.

2. A wireless communication device for performing a random access procedure for a base station operated in an unlicensed band in which Listen Before Talk (LBT) before transmission is required, the wireless communication device comprising:
   a transceiver configured to transmit a message to the base station and then receive a response to the message from the base station, and during an n-th (n≥1) random access procedure, transmit the message to the base station on transmission occasions determined by a parameter and attempt to receive the response to the message after the transmitting; and
   a controller configured to, in response to a failure occurring during the n-th (n≥1) random access procedure, increase, according to a fixed value defined by a communication specification, the parameter used to determine transmission occasions in an (n+1)-th random access procedure.

* * * * *